(12) United States Patent
Schaller

(10) Patent No.: US 6,525,822 B1
(45) Date of Patent: Feb. 25, 2003

(54) METHOD FOR OPTICAL THREE-DIMENSIONAL VELOCIMETRY OF SCATTERED PARTICLES

(75) Inventor: Johannes Schaller, Korntal Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,409

(22) PCT Filed: Sep. 28, 1999

(86) PCT No.: PCT/DE99/03106

§ 371 (c)(1),
(2), (4) Date: Aug. 30, 2000

(87) PCT Pub. No.: WO00/19214

PCT Pub. Date: Apr. 6, 2000

(30) Foreign Application Priority Data

Sep. 28, 1998 (DE) .......................................... 198 44 367
Sep. 27, 1999 (DE) .......................................... 199 46 262

(51) Int. Cl.$^7$ .............................................. G01B 9/021
(52) U.S. Cl. ..................................... 356/457; 356/28.5
(58) Field of Search ................................ 356/28.5, 457

(56) References Cited

U.S. PATENT DOCUMENTS 5,532,814 A * 7/1996 Cha .......................... 356/28.5

OTHER PUBLICATIONS

Schaler et al., *Holographic Investigations of a Diesel Jet Injected Into a High–Pressure Test Chamber*, Part, & Part. Syst. Characterization, vol. 13, No. 3, Jun. 1996, pp. 196–204.*

Arroyo, C.A., *Stereoscopic Particle Velocimetry*, Meas. Sci. Technol., 2, 1181–86, 1991.*

Watt et al., *Turbulent Flow Visualization By Interferometric Integral Imaging and Computed Tomography*, Experiments in Fluids, 8, 301–11, Mar. 1990.**

E.P. Fabry, *3D Holographic PIV With A Forward–Scattering Laser Sheet and Stereoscopic Analysis*, Experiments in Fluids, 24, 39–46, Jan. 1, 1998.**

Bruecker Ch., *3–D PIV Via Spatial Correlation in a Color–Coded Light–Sheet*, Experiments in Fluids, 21, 312–14 Aug. 1, 1996.

Dinkelacker et al., *Determination of the Third Velocity Component With PTA Using An Intensity Graded Light Sheet*, Experiments in Fluids, 13, 357–359, Jan. 1, 1992.**

* cited by examiner

*Primary Examiner*—Samuel A. Turner
*Assistant Examiner*—Patrick Connolly
(74) *Attorney, Agent, or Firm*—Kenyon & Kenyon

(57) ABSTRACT

A three-dimensional particle image velocimetry method is described, in which a stream system containing light-scattering particles is exposed continuously over a certain period or at least two discrete points in time using a laser lightsheet, and a hologram is produced and evaluated. Increased accuracy in determining velocity is achieved by evaluating the hologram with regard to its phase information interferometrically by using a reconstruction wave and superimposing a reference wave.

4 Claims, 2 Drawing Sheets

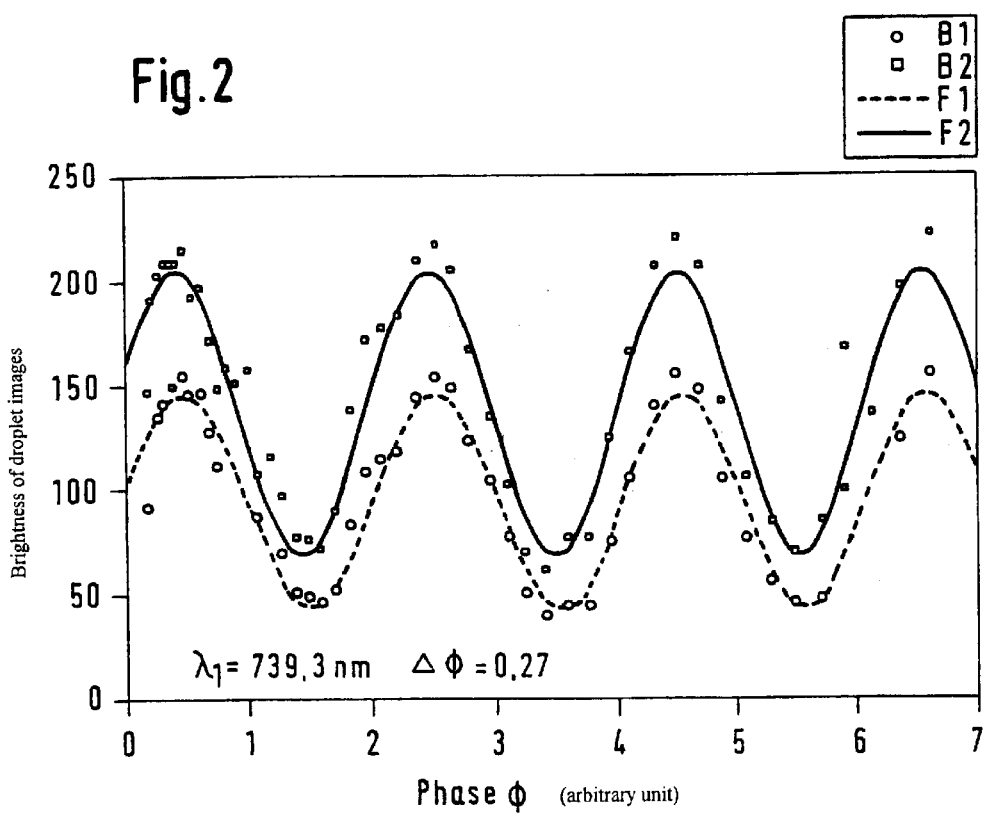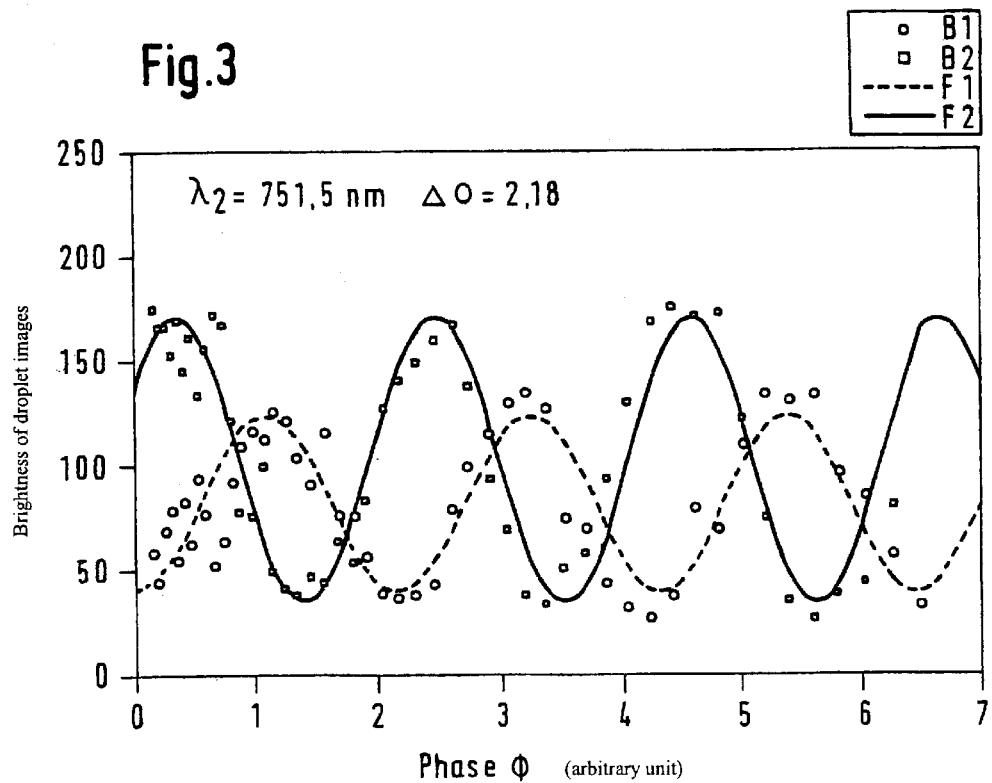

METHOD FOR OPTICAL THREE-DIMENSIONAL VELOCIMETRY OF SCATTERED PARTICLES

BACKGROUND INFORMATION

The present invention relates to a three-dimensional particle image velocimetry method in which a stream system containing light-scattering particles is continuously exposed to a laser lightsheet over a certain period or at least at two discrete points in time and the scattered light from the stream system is evaluated.

Such three-dimensional particle image velocimetry methods applied to droplets have been proposed using different approaches, the primary problem being measurement of the third velocity component in the direction of observation, i.e., perpendicular to the lightsheet. The most common approach uses stereoscopy as described in "Stereoscopic Particle Velocimetry" by M. P. Arroyo, C. A. Greated, Meas. Sci. Technol., 2, 1181–1186, 1991. The depth information is obtained by evaluating the light emitted by the lightsheet from two directions.

Another approach described in "Determination of the third velocity component with PTA using an intensity-graded lightsheet" by F. Dinkelacker, M. Schäfer, W. Ketterle, J. Wolfrum, Exp. Fluids, 13, 357–359, 1992, uses an intensity-coded lightsheet in order to determine the position of the light-scattering particle from the brightness of its image.

Another option investigated by Ch. Brücker in "3-d PIV by spatial correlation in a color-coded lightsheet," Exp. Fluids, 21, 312–314, 1996, uses a plurality of differently colored lightsheets that are slightly offset with respect to one another in order to determine the third component of the spectral composition of the scattered light.

Some degree of success was achieved with each of these methods, but the measuring accuracy for the third velocity component was clearly inferior to the accuracy achieved for the components in the lightsheet plane. In most applications, the absolute velocity is lowest in the direction perpendicular to the lightsheet, so that a higher accuracy is desirable in this direction.

The same velocity measurement accuracy in all three dimensions, i.e., along all spatial axes, has been attainable only via observation from two directions perpendicular to one another, which is, however, associated with a high cost.

SUMMARY OF THE INVENTION

An object of the present invention is to provide a method with which all velocity components can be determined with essentially the same accuracy using a single direction of observation.

This object is achieved according to a method in which, in order to measure a third dimension along the direction of observation, the phase information of the scattered light is evaluated using a reference wave. With this method, the velocity component of the third dimension perpendicular to the lightsheet can be determined with interferometric accuracy.

In one advantageous method, the scattered light is holographically recorded in order to make it accessible to observation when the flow velocity is high. In evaluating the scattered light or the holographically reconstructed scattered light using laser light having a single wavelength, unambiguous measurement is obtained if the interval between exposures or, in the case of continuous exposure, the time period, is selected to be shorter than the time period in which the expected maximum path traveled by the light-scattering particle in the third dimension is smaller than the wavelength of the laser light.

Practically any desired range of unambiguousness can be obtained with respect to the velocities to be measured in the third dimension by performing two measurements with laser light having two or more different discrete wavelengths and by determining the velocity in the third dimension by the principle of multiple wavelength interferometry on the basis of a synthetic wavelength formed from the other two wavelengths. As an alternative, the reconstruction wavelength can be changed continuously.

BRIEF DESCRIPTION OF THE DRAWINGS

FIG. 2 shows the brightnesses of two droplet images recorded at different points in time as a function of the phase of a reference wave for two different wavelengths.

FIG. 3 shows another illustration of the brightness of two droplet images recorded at different points in time as a function of the phase of a reference wave for two different wavelengths.

DETAILED DESCRIPTION

Figure 1:
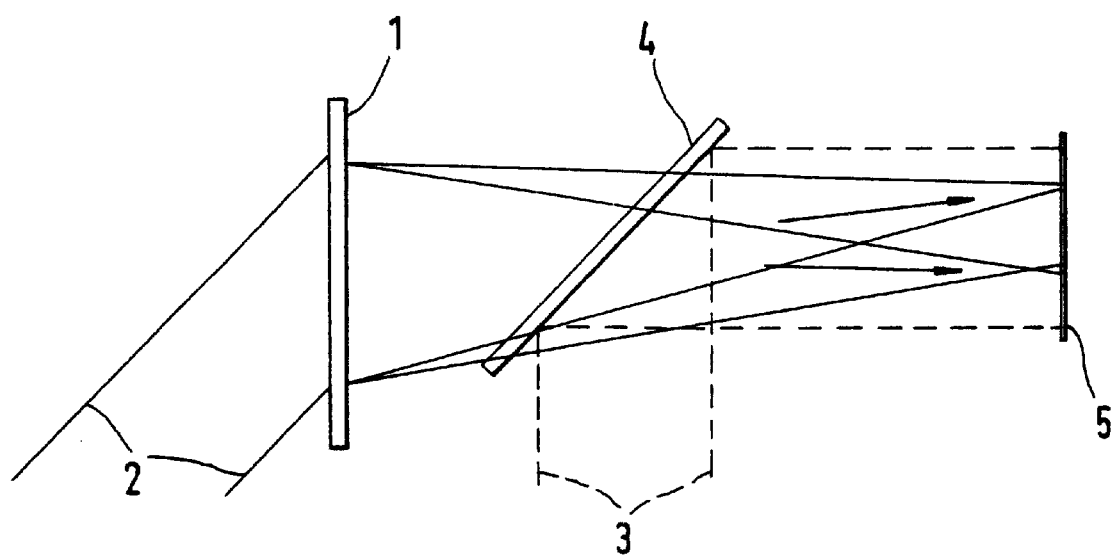
FIG. 1 schematically shows a measuring arrangement for evaluating a hologram in order to determine a velocity component of a droplet in a third dimension that is perpendicular to a lightsheet.

FIG. 1 schematically shows a measuring arrangement for evaluating a third dimension of a droplet velocity that is perpendicular to a lightsheet, i.e., running in the direction of observation. For this purpose, hologram 1, recorded in an essentially known manner (see the aforementioned literature) is introduced in the beam path of a reconstruction wave 2. A beam splitter 4 is arranged further downstream along reconstruction wave 2; the beam splitter superimposes a reference wave 3 on the reconstructed wave image in order to generate an interference pattern, which is visualized using an image recorder 5 or a frosted-glass window.

The principle of three-dimensional velocimetry of light-scattering particles such as droplets, bubbles, or soot particles is based on initially holographically recording the PIV (Particle Image Velocimetry) data as shown by different authors (see J. K. Schaller, C. G. Stoianoff, "Holographic investigations of a Diesel jet injected into a high-pressure test chamber," Part. & Part. Syst. Characterization, Vol. 13, pp. 196–204, 1996).

The novel concept in the present method is the superimposition of the additional coherent reference wave 3 on the reconstructed wave image. Information concerning the distance of the reconstructed images from image recorder 5, such as a camera, is contained with interferometric accuracy in the interference pattern obtained.

The present method can be referred to as "hololexy" (integral reading) by analogy with the term "holography" (integral writing). In common holography, phase information is recorded by superimposing the wave on a coherent reference wave. In the present HIPIV (Holographic Interferometric Particle Image Velocimetry) method, phase information containing the desired distance information is read by superimposition on coherent reference wave 3.

The approach presented above provides unambiguous results only if the shift between the two images of a light-scattering particle between two exposures is smaller than the wavelength of the laser light used. As a rule, for a distance z of an image of a CCD camera the following equation applies:

$$z = \lambda_1 (n_i + \phi_1/2\pi) = \lambda_1 \cdot \Phi_1 \quad (1)$$

where $n_i$ is the order of interference of a phase $\Phi_1$ and a residual phase $\Phi_1$ for a wavelength $\lambda_1$.

The small range of unambiguity can be enlarged almost arbitrarily in the framework of the velocity components that occur and of the pulse interval of the droplets by using multiple wavelength interferometry.

If a distance z for wavelengths $\lambda_{1,2}$ has both phase terms $\Phi_{1,2}$, an unambiguous measurement result is obtained by combining the two results:

$$z = (\Phi_1 - \Phi_2) \Lambda = \Delta\Phi \cdot \Lambda \cdot \mu/2 \quad (2)$$

where $\Lambda$ is a synthetic wavelength.

$$\Lambda = (\lambda_1 \cdot \lambda_2)/(\lambda_1 \cdot \lambda_2) \quad (3)$$

The factor ½ takes into account the expansion/compression of the reconstructed image for different wavelengths. Factor $\mu$ takes into account the ratio of the reconstruction wavelength to the recorded wavelength.

To test the method, a partial image obtained from a reconstructed hologram via PIV data is initially used. Two bright dots show the two images of a droplet obtained at consecutive points in time, as a drop system is exposed. The velocity component that is parallel to the light used for exposure is initially estimated from the shift of the droplet images with respect to one another in the image plane using the time interval between exposures.

Two additional partial images are derived from the PIV data hologram by superimposing the initially reconstructed partial image according to FIG. 1 on additional reference wave 3. For example, constructive interference was recognizable for both droplet images in the first partial image obtained with superimposition on reference wave 3, which made the droplet images considerably brighter than in the partial image prior to superimposition. Destructive interference was forced, by varying the phase of reference wave 3, in a second partial image, in which both droplet images can now be recognized as dark spots.

To verify the method, the same pair of droplets was analyzed in the reconstructed hologram of the PIV data for different wavelengths. For each wavelength, the phase of reference wave 3 was monotonously varied, and approximately 20 interference images were recorded. The multiple changes between constructive and destructive interference can be clearly seen from the oscillating brightnesses of the droplet images.

Such image series are recorded for different wavelengths and further processed using digital image processing. For this purpose, the individual droplet positions are located and the brightnesses of the droplet images are determined by adding up their grayscale values. In FIGS. 2 and 3 the brightnesses of both images of a droplet are shown for two different wavelengths $\lambda_1 = 739.3$ nm and $\lambda_2 = 751.5$ nm as a function of phase $\Phi$ of reference wave 3.

The individual measured values are adjusted to a function of the type $$\text{Brightness} = P_1 \cdot \sin(P_1 \cdot \Phi + P_3) + P_4. \quad (4)$$

The difference of the phase terms $P_3$ of the two droplet images is denoted as phase difference $\Delta\Phi$ (see eq. 2) and is shown in FIGS. 2 and 3 for both wavelengths.

FIGS. 2 and 3 clearly show the oscillating brightness of the droplet images. In FIG. 2, both droplet images oscillate almost in phase ($\Delta\Phi_1 = 0.27$). For the modified wavelengths according to FIG. 3, a phase difference $\Delta\Phi_2 = 2.18$ can be observed.

The two wavelengths shown in FIGS. 2 and 3 correspond to a synthetic wavelength according to eq. 3 of $\Lambda = 45.54$ μm. The difference between phase terms $\Delta\Phi = \Delta\Phi_1 - \Delta\Phi_2 = 1.91$ results, after normalization with $2\pi$ using eq. 3, in a shift of the droplet by $\Delta z = 7$ μm along the direction of observation. The shifts in the two other dimensions x and y are determined from the single video image, for example, without superimposition of reference wave 3 and were found to be, in the given example, $\Delta x = 37$ μm and $\Delta y = 36$ μm with an error of approximately 10%. The three-dimensional droplet velocity can be determined from this data using the pulse interval of 10 μs between the two exposures.

The experimental investigations have shown the feasibility of the measurement principle; the measurement results, which are already satisfactory, can be drastically improved through automation. The experimental error for a problem-adjusted selection of the construction wavelengths ($\Lambda = 37$ μm) is approximately 1 to 2 μm.

What is claimed is:

1. A method for performing a three-dimensional particle image velocimetry, comprising the steps of:

causing a laser lightsheet to continuously expose a stream system containing light-scattering particles over one of a period of time and at least at two discrete points in the period of time;

recording scattered light from the stream system;

evaluating the scattered light; and in order to measure a third dimension along a direction of observation, evaluating a scattered light phase information by superimposing a reference wave on the scattered light.

2. The method according to claim 1, wherein:

the scattered light is evaluated according to an interferometric evaluation, and prior to the interferometric evaluation, the scattered light is holographically recorded.

3. The method according to claim 1, further comprising the step of:

in one of an interval between times of exposure and a time of exposure for a continuous exposure, selecting the time of exposure to be shorter than a time period in which an expected maximum path traveled by the light-scattering particles in the third dimension is shorter than a wavelength of a laser light.

4. The method according to claim 1, further comprising the steps of:

one of obtaining a plurality of measurements with a laser light having different discrete wavelengths, and continuously changing a reconstriction wavelength; and determining a velocity in the third dimension on the basis of at least one synthetic wavelength formed from two wavelengths according to a multiple wavelength interferometry.

* * * * *